Patented Aug. 1, 1933

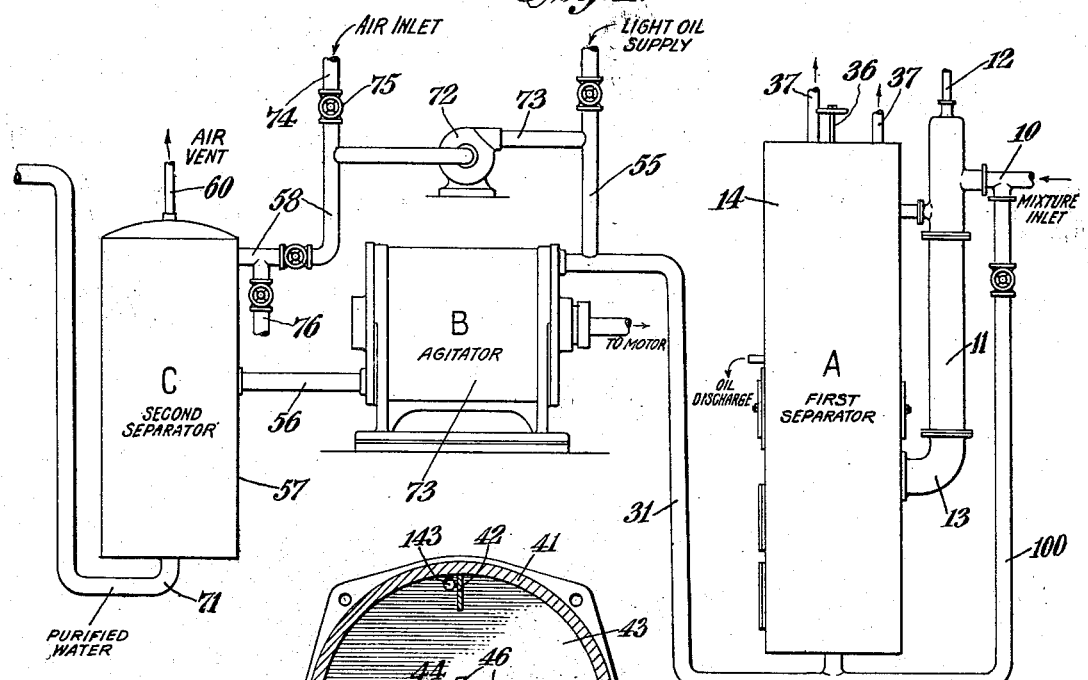

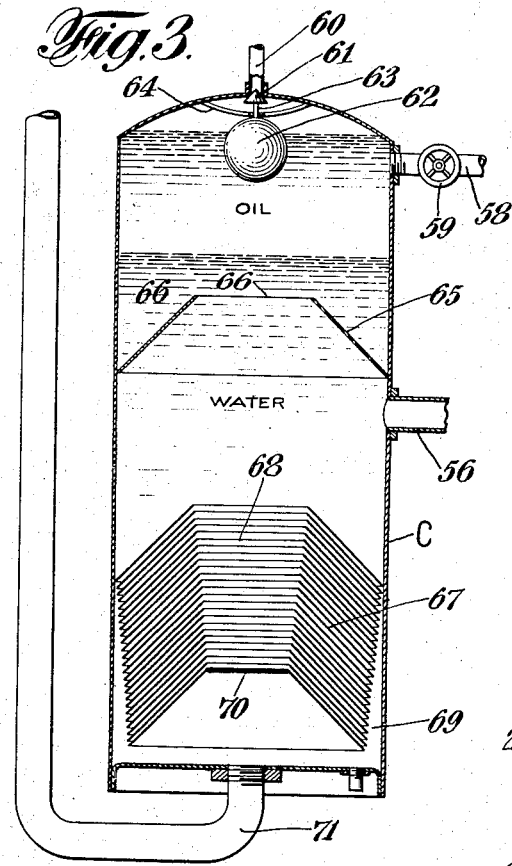
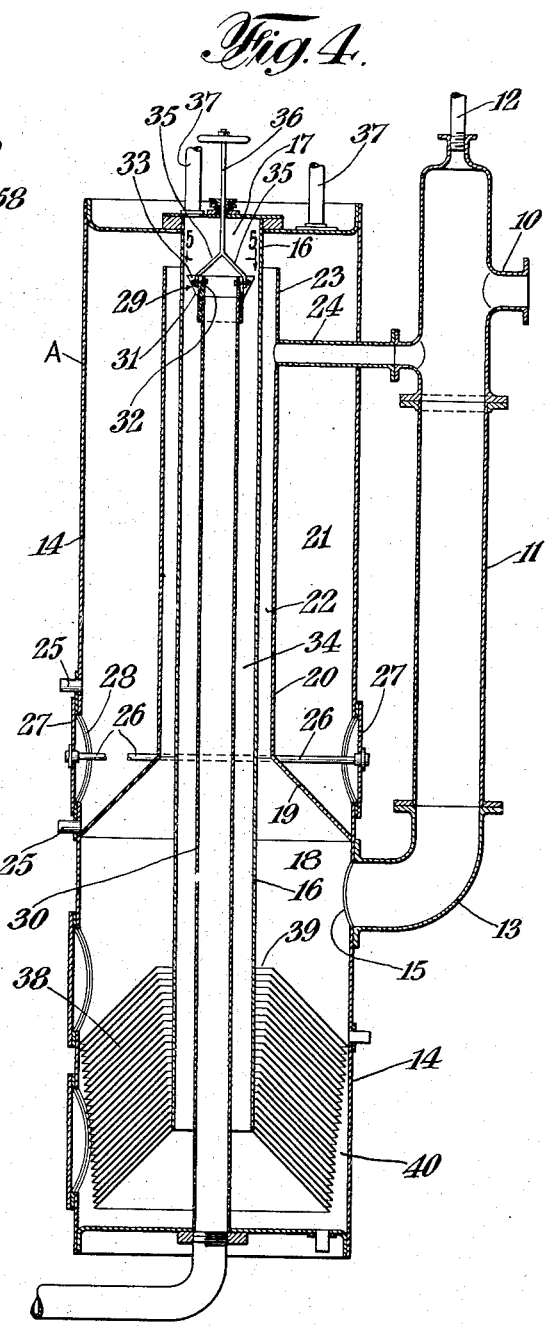
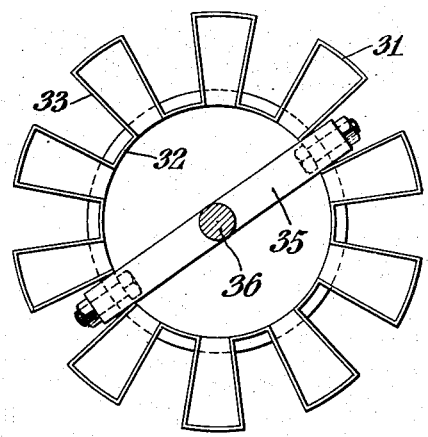

1,920,565

UNITED STATES PATENT OFFICE 1,920,565

SEPARATION OF MIXTURES OF WATER WITH OIL

Leo D. Jones, Philadelphia, Pa., assignor to The Sharples Specialty Company, Philadelphia, Pa., a Corporation of Delaware Application June 12, 1928. Serial No. 284,848

12 Claims. (Cl. 196—3)

This invention relates to the process and apparatus for the separation of oil or emulsions or oily matter from water.

Mixtures of oil with water occur in industrial operations and in the operations of ships and also occur naturally and it is frequently difficult to effect a desirably complete and rapid separation of the oil or emulsions or oily matter from the water although it is highly desirable to effect such a separation for the purpose of recovering the oil for purifying the water or for preventing the polution of streams and navigable waters or for other reasons. Among other difficulties encountered in the removal of oil or emulsions or oily matter from water is the fact that the oil may be finely dispersed in the water and therefore separate from the water very slowly under the action of gravity, or the oil or emulsions or oily matter may possess a specific gravity differing but slightly from the specific gravity of water, or it may be necessary to purify a body of oil-contaminated water very rapidly and very completely even though the body of mixture is very large, or any two or more of such difficulties may be encountered simultaneously.

An object of this invention is to provide a method and apparatus whereby the above mentioned and other difficulties in the separation of oil from water may be overcome and whereby oil or oil emulsions or oily matter may be rapidly and completely separated from water.

An important and illustrative example of the practice of my invention, to which example my invention is not limited, is the separation of oil or emulsions or oily matter from water on shipboard, and particularly on oil-burning ships. On ships the bilge water and ballast water and the settlings from the fuel oil constitute mixtures of oily material with water, in which the oil or oily matter may be finely dispersed or may have a specific gravity differing little from the specific gravity of water or may constitute but a very small fraction of the mixture although water discharged overboard must be freed of oily material very rapidly and very completely.

In the practice of this invention oil or emulsions or oily material may be separated rapidly and very completely from water in spite of difficulties that have previously prevented complete and rapid removal of oil from water. In general the oil-contaminated water is so contacted with oil that is preferably lighter than the oil that contaminates the water that dispersed particles of oil or emulsion or oily material will be agglomerated or will be taken into the light oil and the rapid and complete removal of the contaminating oil will be facilitated. Moreover, the light oil used to aid the removal of contaminated oil may contain an agent capable of reversing the tendency of the contaminating oil to emulsify with the water to form either an oil-in-water emulsion or a water-in-oil emulsion. The lighter oil readily agglomerates or coalesces with dispersed particles of oil and it acts to reduce the specific gravity of the oil mixed with the water and it is capable of taking up from the water very finely dispersed particles or films of oil that might otherwise be removed only by using a filter and thereby adding to the separating operation the expense and trouble of renewal of clogged or saturated filters or filtering material. Also, air may be employed to assist the removal of contaminating oil by means of light oil.

This invention includes further features which cooperate with the use of light oil either alone or in conjunction with an emulsion controlling agent or in conjunction with the use of air. Thus, a mixture may be subjected to a more or less coarse or bulk separation to remove as much as possible of the oily impurities before the mixture is treated with oil or emulsion controlling agent or air. Also, the treatment of the oil contaminated water with oil alone or with oil containing an emulsion controlling agent, with or without the simultaneous use of air, may advantageously be effected by agitation that is preferably extensive and induced by the application of forces from an external source.

The light oil employed in the removal of oil from water in accordance with my invention may be so chosen as to meet the conditions incident to the purifying operation. As an example light oil used in the separation of contaminating oil from ballast water may be a distillate fuel oil or gas oil, such as bunker oil "A" of the specifications of the United States Navy or any oil having a specific gravity of about 30° Bè. to 34° Bè. and having a viscosity but little greater than the viscosity of kerosene.

Emulsion-controlling agents employed in the practice of my invention may be so selected that the agent will be dissolved in the light oil and will be effective to reduce the stability of the emulsion of oil in water. For example such hydrophobe emulsion-controlling reagents may be employed as calcium oleate or other reagents that will dissolve in the light oil and act to reduce the stability of an emulsion consisting of oil dispersed in water. To reduce the stability of an emulsion of water in oil, sodium resinate may be employed, which is a hydrophile reagent.

Other and further objects and advantages of my method and apparatus will be apparent from the following description of an illustrative embodiment of my invention and of the operation thereof.

In the drawings in which like reference characters indicate similar parts,

Fig. 1 shows diagrammatically one form of apparatus embodying my invention and whereby my process may be practised;

Fig. 2 shows in vertical section an agitating means that may be employed in the apparatus shown diagrammatically in Fig. 1;

Figs. 3 and 4 show in vertical section separating elements that may be embodied in the apparatus shown diagrammatically in Fig. 1;

Fig. 5 is a partial sectional view on the line 5—5 of Fig. 4; and

Fig. 6 is a sectional view taken on line 6—6 of Fig. 2.

While the apparatus shown in the drawings is intended for the complete treatment of a body of water containing relatively large quantities of oil it is to be understood that it is within the spirit of my invention to use certain parts of the apparatus shown in the drawings so long as the desired separation of oil can be accomplished thereby in accordance with some one or more of the features of my invention.

Referring to the drawings a first separation of oil from water is effected in the first separator A. The residue that still contains some oil is contacted in the contacting means B with light oil that either contains or is free of an emulsion-controlling agent, the contacting being carried out if desired in the intimate presence of air or other gas. The mixture produced in contacting means "B" is then separated in the second separator "C" into pure water and oil and may or may not be reused, as desired, in contacting means "B". An obvious modification of the use of this apparatus is the omission or by-passing of the first separator A, particularly when the mixture contains but a small percentage of oil, as by means of valve-controlled by-pass 100.

In the separator "A" mixture is introduced through inlet 10 to gas and bulk oil separator 11 that is provided at its upper end with vent 12 and from the lower end of which mixture discharges through pipe 13. The main chamber 14 of the first separator "A" is provided with an inlet 15 with which pipe 13 communicates. Tubular partition 16 extends from the top of chamber 14 to a point near the bottom thereof and divides chamber 14 into an inner compartment 17 and an outer compartment 18. In outer compartment 18 a frusto-conical partition 19 acts with tubular partition 20 that extends upwardly from partition 19 to form with the side wall of chamber 14 an oil receiving compartment 21, and partition 20 cooperates with partition 16 to form an upwardly extending relatively long oil discharge passage 22 leading from compartment 18 to compartment 21, the upper edge 23 of partition 20 constituting an oil discharge weir.

Oil that separates out in chamber 11 is conducted to oil passage 22 by means of pipe 24. Oil may be conducted in any suitable manner from compartment 21 as by pipes 25, and while in compartment 21 the oil may be heated by steam coils 26 that are conveniently mounted on the removable manhole covers 27 that are suitably held in place to close the manholes 28.

Within compartment 17 there is positioned a weir 29 over which water discharges, the water being led from chamber 14 in any suitable manner as by pipe 30 which leads out of the bottom of chamber 14. Weir 29 is preferably an extended weir, i. e. a weir having very considerable length but of limited horizontal dimensions. Thus the weir 29 may be substantially sinuous in horizontal configuration, being made up of outwardly diverging portions 31 and inwardly converging or vertical portions 32 having their edges joined as shown by substantially triangular portions 33. Weir 29 is advantageously screw-threaded upon pipe 30 to facilitate adjustment of the level thereof in order that liquid balance will be maintained between the column of water, or water-containing but little oil, that is contained in compartment 17, and the column of oil or oil and water that is contained in oil discharge passage 22. To facilitate such adjustment a yoke 35 may be arranged in cooperative relation with weir 29 and provided with a stem 36 extending through the top of chamber 14. Chambers 17 and 18 are provided at their tops with vents 37. The level of weirs 29 and 23 bears such relation to inlet 10 that the level of liquid in compartment 11 is at or adjacent the level of inlet 10, such a relation minimizing the possibility that air or gas will be entrained in the liquid passing downward in chamber 11 and carried into the passages 22 and 34 to disrupt the balance of the columns of liquid contained in those passages.

Within the lower zone of compartment 18 there may be positioned, if desired, a nest of frusto-conical plates 38, the uppermost plate of which engages the wall of chamber 14 and the lowermost plate of which engages partition 16. The uppermost plate 38 has its inner edge spaced from partition 16 and successively lower plates 38 have their inner edges spaced at successively lesser and lesser distances from partition 16 in order to provide a downwardly converging passage 39 that will act to equalize flow between plates 38. The lowermost plate 38 has its outer edge spaced from the wall of chamber 14 and successively higher plates 38 have their edges spaced at successively decreasing distances from the wall of chamber 14 to form a downwardly expanding passage 40 that cooperates with passage 39 to equalize the flow of liquid between the plates 38 from compartment 18 to compartment 17.

When mixture enters compartment 11 through inlet 10 gas or air will escape therefrom and be discharged through vent 12 and any large body of oil separating out will pass through pipe 24 to oil discharge passage 22. Residual mixture will enter compartment 18 that is of relatively larger transverse area and further separation of oil will occur, the oil rising in passage 22. The then remaining residue will flow between plates 38 which divide the mixture into different layers of relatively small vertical section to the end that the flow will be non-turbulent and oil will separate from the water by rising a small distance through the water. As the mixture passes between the plates 38 particles of oil will come into contact with plates 38 and coalesce with oil thereon forming relatively large globules that will rise in passage 39 and find their way into oil discharge passage 22. Water will rise in compartment 17 and in passage 34 and will flow over weir 29 and will be discharged through pipe 30.

Inasmuch as the discharge of oil and water or water containing a little oil is determined by the liquid balance preserved by weirs 29 and 23, the relatively great length of weir 29 will prevent the occurrence of a deep crest over that weir that might disturb the balance. Moreover the symmetrical arrangement of weirs 23 and 29 and their close relative positions renders the apparatus particularly suitable to use on shipboard because motion of the ship will not greatly vary the control by the weirs of the discharge of separated substances. Preferably the weirs are so adjusted that the division line between oil and water is located within passage 22, such an arrangement being particularly desirable on shipboard.

Residual mixture or water discharged from first separator "A" through pipe 30, or original mixture of low oil content and flowing through by-pass 100, is conducted by pipe 31 to oil-contacting means B which comprises a casing 41 having any desired number of radially inwardly extending baffles or wings 42 and preferably having annular partitions 43, each provided with a central opening 44, and provided, if desired, with openings 143. Axially of casing 41 is positioned an agitator comprising a shaft 45 carrying agitating members 46. One end of the shaft is mounted in bearing 47 that is closed by cap 48 and the shaft extends out of casing 41 through bearing 49 that is provided with a packing gland 50. The shaft may be driven in any suitable manner as by motor 51, the shaft of which is connected to shaft 45 by any suitable coupling 52.

Agitating members 46 may be connected to shaft 45 in any suitable manner as by being formed with or upon a collar 53 fixed in place on shaft 45 as by pins 54. Light oil of a suitable character and in suitable quantity, e. g., in the proportion of one-tenth of one percent up to one percent or more of the mixture to be separated may be added to the mixture entering the agitator through pipe 31 by being introduced through pipe 55 that leads into pipe 31 from a suitable oil supply (not shown).

Agitated mixture is conducted from agitator B through pipe 56 to second separator "C". Separator "C" comprises a tank 57 into which pipe 56 leads at an intermediate level and from which light oil together with heavy oil picked up thereby or agglomerated or coalesced therewith is discharged through pipe 58 controlled by valve 59. From the top of tank 57 leads a vent 60 controlled by valve 61 that is operated by float 62 through the intervention of a stem 63 that is constrained by guide 64. Above the inlet of tank 57 there is positioned a baffle 65 having a central opening 66 and acting to minimize agitation of the dividing line between the oil and water. Within the lower zone of tank 57 and preferably below the inlet thereto there may be positioned a nest of frusto-conical plates 67 having central openings providing a passage 68.

The outer edge of the uppermost plate 67 engages the wall of tank 57 and successively lower plates 67 have their outer edges spaced at increasing distances from the wall of tank 57 to provide a downwardly expanding flow-equalizing passage 69. The central opening of the lowermost plate 67 is closed by a plate 70. Clear water, or at least water sufficiently freed of oil, is withdrawn from the bottom of tank 57 by pipe 71 that preferably leads to a point above the top of tank 57 in order to maintain a suitable pressure within tank 57 that will facilitate the discharge of oil through pipe 58 and insure the proper operation of valve 61.

For continuous operation a pump 72 may have its suction side connected to oil discharge pipe 58, pump 72 having a discharge pipe 73 that preferably leads into oil supply pipe 55. Thus a continuous circulation of the same quantity of light oil may be maintained until its effectiveness is reduced by the absorption of heavy oil from the mixture. Light oil may be withdrawn from the system at any time through valved pipe 76.

As a feature of my invention an air or gas inlet pipe 74 may lead into pipe 58, being controlled by valve 75, whereby, during operation of pump 72, air may be drawn through pump 72 and passed through pipe 55 into agitator "B". When both air or gas and oil are agitated with a mixture and passed into second separator "C" the rising of the resulting fine bubbles of gas within second separator "C" will facilitate the separation of oil from water therein, presumably because of the tendency of oil to form a film on an interface between gas and water.

While I have described certain applications of my process and certain apparatus embodying my invention, in great detail I do not intend that my invention shall be limited to such details but that it shall include such modifications and variations as fall within the claims. In this connection it is to be noted that the emulsion-controlling agent may be a hydrophobe agent which tends to produce an emulsion of water dispersed in oil and to reduce the stability of an emulsion of oil dispersed in water or it may be a hydrophile agent which tends to produce an emulsion of oil dispersed in water or to reduce the stability of an emulsion of water dispersed in oil. Any suitable hydrophobe or hydrophile reagent may be used. Also, this application is a continuation of my co-pending application Serial No. 279,918, filed May 23, 1928, in part.

I claim:

1. In apparatus for the separation of oil or emulsion or oily material from a mixture thereof with water, means including a container having a mixture inlet for continuously separating oily material from water by subsidence, an agitating chamber, a pipe conducting liquid from a lower level of said container to said agitating chamber, means for introducing oil into said chamber, agitating means within said chamber and operated from an external source of power, and means for separating oil by subsidence from mixture produced in said chamber.

2. In apparatus for the separation of oil or emulsion or oily material from a mixture thereof with water, means for contacting oil with such mixture, a separator for separating oil by difference of specific gravity from mixture produced in said contacting means, and means for returning to said contacting means supernatant oil recovered in said separator.

3. In apparatus for the separation of oil or emulsion or oily material from a mixture thereof with water, an agitating tank including mechanically operated agitated means, means for introducing mixture into said tank, means for introducing gas and oil into said tank, a vented separating tank, a conduit for conducting mixed gas and liquid from said agitating tank to said separating tank, and means for conducting supernatant oil from said separating tank to said means for introducing oil to said agitating tank.

4. In apparatus for the separation of oil or emulsion or oily material from a mixture thereof with water, an agitating tank, means for separating oil from water, means for conducting mixture from said tank to said separating means, a pump having a suction line adapted to receive oil from said separating means and being provided with an air inlet and having its discharge side in communication with said tank, and means whereby mixture is introduced to said tank.

5. In apparatus for the separation of oil or emulsion or oily material from a mixture thereof with water, a tank provided with a mixture inlet and having therein means for contacting oil with mixture, a gravity separator, means for conducting the mixture from said tank to said separator, means for withdrawing water from a lower level of said separator, and means for withdrawing oil from an upper level of said separator and returning it to said tank.

6. In apparatus for the separation of oil or emulsion or oily material from a mixture thereof with water, a tank provided with a mixture inlet and having agitating means therein, means for introducing oil and gas into said tank, a gravity separator having a water outlet at a lower level thereof, a gas vent at the top thereof and an oil outlet, and means for conducting agitated mixture from said tank to an intermediate level of said separator.

7. In the de-oiling of water containing oil or emulsion or other oily material in the form of particles that are dispersed in the water and that do not separate readily from the water by gravity, the steps comprising contacting such mixture with oil containing an emulsion-controlling agent and bringing the oil into contact with the dispersed oily particles, and separating oil from the resulting mixture by subsidence.

8. In the de-oiling of water containing oil or emulsion or other oily material in the form of particles that are dispersed in the water and that do not separate readily from the water by gravity, the steps comprising contacting such mixture with oil containing a hydrophobe emulsion-controlling agent and bringing the oil into contact with the dispersed oily particles, and separating oil from the resulting mixture by subsidence.

9. In the de-oiling of water containing oil or emulsion or other oily material in the form of particles that are dispersed in the water and that do not separate readily from the water by gravity, the steps comprising contacting such mixture with oil containing a hydrophile emulsion-controlling agent and bringing the oil into contact with the dispersed oily particles, and separating oil from the resulting mixture by subsidence.

10. The method of separating oil from ballast water in which it is contained in the form of a finely divided emulsion or suspension of a relatively minute proportion of oil in water, which comprises adding to the mixture an oil of substantially lower specific gravity than the average specific gravity of the oil contained therein, bringing the added oil into contact with the dispersed particles of oil and effecting a coalescence of the added oil therewith by agitation, and then separating the added oil together with the oil already contained in suspension or emulsion, from the mixture by subsidence.

11. The method of separating oil from ballast water in which it is contained in the form of a finely divided emulsion or suspension of a relatively minute proportion of oil in water, which comprises adding to the mixture an oil of lower specific gravity than the average specific gravity of the oil contained therein, bringing the added oil and a gas into contact with the dispersed particles of oil and effecting a coalescence of the added oil therewith by agitation, and then separating the added oil together with the oil already contained in suspension or emulsion, from the mixture by subsidence.

12. The method of separating oil from ballast water in which it is contained in the form of a finely divided emulsion or suspension of a relatively minute proportion of oil in water, which comprises adding to the mixture an oil of lower specific gravity than the average specific gravity of the oil contained therein, bringing the added oil into contact with the dispersed particles of oil and effecting a coalescence of the added oil therewith by agitation, then separating the added oil together with the oil already contained in suspension or emulsion, from the mixture by subsidence, and recycling separated oil to contact it with fresh quantities of mixture to be separated.

LEO D. JONES.